Figure 1:
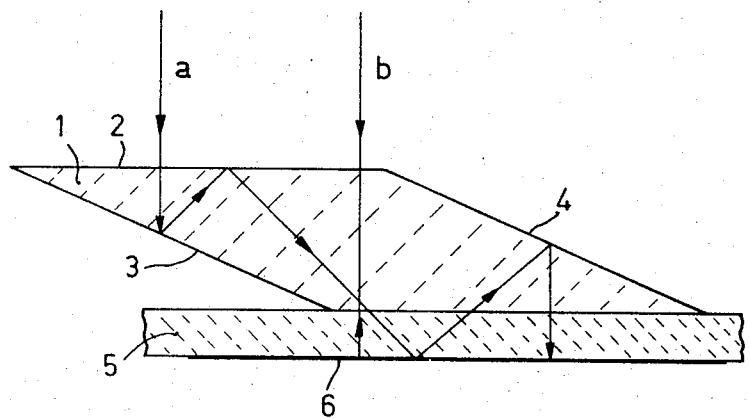

United States Patent [19]
Evrard et al.

[11] 3,873,829
[45] Mar. 25, 1975

[54] PHOTO CATHODE WITH MEANS PROVIDED WHICH PRODUCE A REPEATED TOTAL REFLECTION OF THE INCIDENT LIGHT WITHOUT INTERFERENCE PHENOMENA

[75] Inventors: Robert Evrard, Paris; Daniel Louis Poulain, Champigny S/Marne, both of France

[73] Assignee: U.S. Philips Corporation, New York, N.Y.

[22] Filed: Nov. 30, 1973

[21] Appl. No.: 420,434

Related U.S. Application Data
[63] Continuation of Ser. No. 147,808, May 28, 1971, abandoned.

[30] Foreign Application Priority Data
May 29, 1970 France .............................. 70.19727

[52] U.S. Cl................. 250/213 R, 250/216, 313/94
[51] Int. Cl. ............................................. H01j 31/50
[58] Field of Search...................... 313/102, 103, 94; 250/213 R, 213 VT, 216, 211 R, 211 J; 350/276

[56] References Cited
UNITED STATES PATENTS

| | | | |
|---|---|---|---|
| 2,837,006 | 6/1958 | Schwede | 350/276 |
| 2,892,096 | 6/1959 | Kruse | 250/213 R |
| 3,043,976 | 7/1962 | Kossel | 313/94 |
| 3,258,590 | 6/1966 | Goodbar | 350/276 |
| 3,551,841 | 12/1970 | Harrick | 250/207 |
| 3,700,947 | 10/1972 | Goodrich | 250/213 VT |

*Primary Examiner*—James W. Lawrence
*Assistant Examiner*—D. C. Nelms
*Attorney, Agent, or Firm*—Frank R. Trifari; Simon L. Cohen

[57] ABSTRACT
Device comprising a photoelectrically sensitive layer, in particular a photo cathode, which is supported by a transparent plane-parallel support through which the light is incident and on which means are provided which produce a repeated total reflection of the incident light without interference phenomena.

5 Claims, 3 Drawing Figures

*INVENTORS*
ROBERT EVRARD,
DANIEL POULAIN

BY

*Frank R Dufain*
AGENT

A PHOTO CATHODE WITH MEANS PROVIDED WHICH PRODUCE A REPEATED TOTAL REFLECTION OF THE INCIDENT LIGHT WITHOUT INTERFERENCE PHENOMENA

This is a continuation of application Ser. No. 147,808, filed 5/28/71, now abandoned.

The invention relates to a device comprising a photoelectrically sensitive layer, in particular a photocathode, which is supported by a transparent plane-parallel support through which the light is incident and on which means are provided which produce a repeated total reflection of the incident light without interference phenomena.

In thin photoelectrically sensitive layers it is usually a problem to obtain a sufficient interaction between the light and the sensitive layer. In a photocathode, which usually is provided on a flat part of the wall of the discharge tube, losses occur by reflection and by transmission. The same applies to the sensitive layer of the camera tube. The transmission could be reduced by using a thicker layer, but in photocathodes this usually has the drawback that that the liberated electrons can emerge only from a small depth. Photoresistance layers and sensitive layers of camera tubes may often be only thin for other reasons.

Constructions are known in which a prism or a quadrantal cylinder is adhered to the flat window of a photo-electron multiplier or to the window of a camera tube in such manner that the incident light possibly after reflection in the prism, experiences a repeated total reflection in the plane-parallel support of the photocathode on the sensitive layer of the camera tube. Reference is made to Applied Optics 4, 512–513, 1965; Applied Optics 5, 1335–1336; J. F. James and R. S. Sternberg: The Design of Optical Spectrometers, pp. 162–163 (Chapman and Hall 1969). The advantage of the repeated total reflection is that the light which nevertheless penetrates into the sensitive layer penetrates at an acute angle so that the absorption with the same layer thickness is larger.

The drawback of the known construction is that both the aperture angle and the cross-section of the incident beam are strongly retricted and that the axis of the incident beam encloses an angle with the axis of the device. Similar drawbacks apply also if an intermediate layer is provided between the support and the photoelectrically sensitive layer to obtain frustrated total reflection, as described, for example, in French Patent Specification No. 1,552,520.

According to the invention, in a device comprising a photoelectrically sensitive layer, in particular a photocathode, which is supported by a transparent planeparallel support through which the light is incident and on which means are provided which produce a repeated total reflection of the incident light without interference phenomena, transparent bodies adjoining each other are arranged on the support on the side remote from the sensitive layer, at least the surface facing the incident light being fully transparent, said bodies having primatic cross-sections and generatrices parallel to the support and parallel to each other, the side faces of said bodies which enclose an acute or obtuse angle with the support being reflective in such manner that the perpendicularly incident light, possibly after total reflection on the front face of said bodies, is thrown into the support and can, at most for a small part, emanate in the direction of the incident light after reflection at the electrically sensitive layer.

In a simple embodiment of the invention the prismatic bodies adjoining each other have a plane parallelogram as a cross-section, the acute angle of which is chosen to be such that the light which is perpendicularly incident on the front face experiences, after reflection on the side face, total reflection on the front face, the front face being equal to the projection of the side face on the front face or only slightly larger.

In another embodiment of the invention, the prismatic bodies have a pentagonal cross-section a short side of which is located against the plane-parallel support, two sides, which enclose an obtuse angle with the said short side are reflecting, and the two remaining sides enclose an obtuse angle with each other and are directed towards the incident light, the whole cross-section being symmetrical relative to the short side touching the plane-parallel support.

In a further embodiment the prismatic bodies have a cross-section corresponding to an isosceles trapezium the top of which touches the plane-parallel support and the upright sides of which are reflecting, a triangular recess located symmetrically relative to the trapezium being formed from the base in the plane of the trapezium.

In the two last mentioned embodiments the transparent bodies may adjoin metal or other reflecting bodies present between said bodies on the support, in which it is not necessary for the side faces of the prismatic bodies to be metallized.

Figure 2:
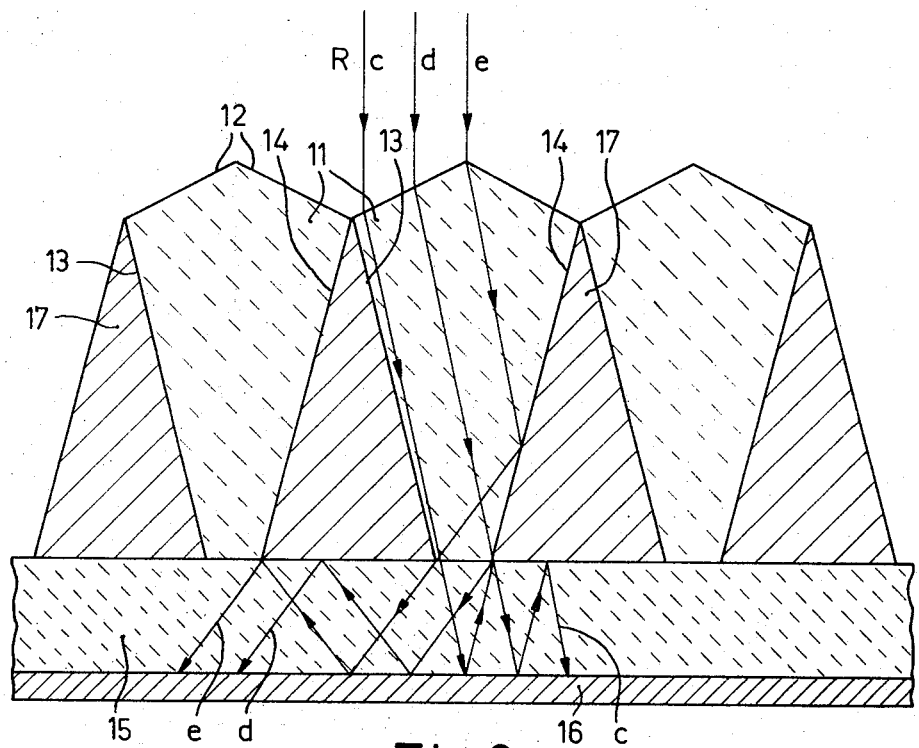
Figure 3:
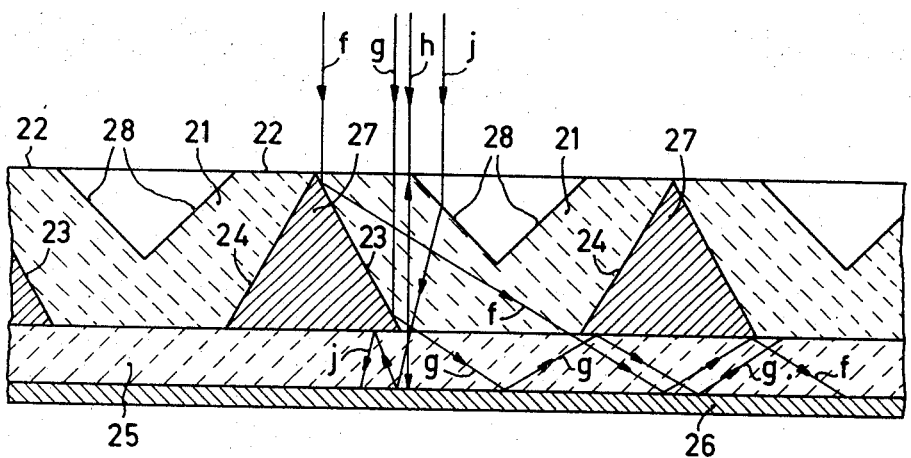

In order that the invention may be readily carried into effect, three embodiments thereof will now be described in greater detail by way of example, with reference to:

FIG. 1 is a cross-sectional view at right angles to the generatrices of the prismatic bodies of a first embodiment, FIG. 2 is a cross-sectional view at right angles to the generatrices of the prismatic bodies of a second embodiment of the invention, and FIG. 3 is a cross-sectional view at right angles to the generatrices of the prismatic bodies of a third embodiment of the invention.

FIG. 1 shows only one of the prismatic bodies which accurately adjoin each other, which body is denoted by reference numeral 1. The light is incident through the upper face 2. The side faces 3 and 4 are metallized and the lower face adjoins the plane-parallel support 5, on which the photo-electrically sensitive layer 6 is present.

Two incident light rays $a$ and $b$ are shown in the Figure. The light ray $a$ first experience a reflection at the side face 3, a total reflection at the upper face 2, then a total reflection at the photo-electrically sensitive layer 6, a reflection at the side face 4, and then incides perpendicularly on the photoelectrically sensitive layer 6. In connection with the index of refraction of the body 1, the angle between the faces 1 and 3 is chosen to be so that the perpendicularly incident light, after reflection at the side face 3, experiences a total reflection at the front face 2. The index of refraction of 1 in a certain case is 1.7 for a red light and the angle between 2 and 3 is 20 to 25°. It is shown in the Figure how a perpendicularly incident ray $b$ which is incident through that part of 2 which is located beyond the projection of the side face 3 can be totally reflected on the front face 2 at the layer 6. The extension of the part which is available for the ray *b* depends upon the requirements imposed upon the improvement to be achieved by means of the invention and the cost to be spent on the manufacture of the bodies 1. When the part for the ray *b* is not larger than 15 percent of the whole front face, the losses by transmission and reflection at the photocathode by means of the construction shown in FIG. 1 can be restricted to 40 percent against 60 percent without the use of the invention. This means an improvement by a factor 1.5.

Referring now to FIG. 2, the prismatic bodies 11 have a pentagonal cross-section a short side of which touches the plane-parallel support 15 and the bent upper face 12 of which show an obtuse angle. The side faces 13 and 14 adjoin intermediate metal members 17 so that reflection can occur at the side faces 13 and 14. The photo-electrically sensitive layer is denoted by 16. The course is shown of three rays *c*, *d* and *e* after refraction and reflection, in which it is obvious that only very few possibilities exist to cause perpendicularly incident light to emanate in the direction of incidence after the reflection at the layer 16.

In FIG. 3, the tansparent bodies 21 have the cross-section of an isosceles trapezium with base 22 and a top touching the plane-parallel support 25. The bodies 21 adjoin metallized members 27, a triangular recess having side faces 28 being provided from the base 22. Four perpendicularly incident rays *f*, *g*, *h* and *j* are shown in which it is to be noted again, that only ray *h*, like *b* in FIG. 1, can be reflected at the layer 16 in the direction of incidence.

For completeness' sake it should be noted that for simplicity of the drawing any differences in indices or refraction between prismatic bodies 1, 11 and 21 on the one hand and the plane-parallel support 5, 15, 25 on the other hand have not been taken into account.

What is claimed is:

1. A photoelectric device, comprising a transparent plane parallel support, a photocathode in the form of a layer on one side of the support, and a plurality of adjoining prisms arranged on the side of the support remote from the photocathode layer, each prism containing at least one end surface substantially parallel to the photoconductor layer, the generatrices of all the prisms being mutually parallel and parallel to the photocathode layer, the prisms each having totally reflective side faces adjoining the end faces and making an angle greater than zero with aid surface of the support, the prisms each having at least one transparent entrance face spaced from said one end surface for admitting radiation into the prism and for internally reflecting radiation reflected onto the entrance face from the totally reflecting side faces and from said one end face, the angles of the side faces being sufficient to produce multiple internal reflections within the device and thereby substantially eliminate retroreflection of the impinging radiation.

2. A device as claimed in claim 1 characterized in that the transparent bodies which adjoin each other have a plane parallelogram as a cross-section, the transparent bodies comprising means for totally reflecting light perpendicularly incident on the front face from the side face to the front face, and for totally reflecting light from the front face to the sensitive layer, the front face being substantially equal to the projection of the side face on the front face.

3. A device as claimed in claim 1, characterized in that the transparent bodies have an asymmetrical pentagonal cross-section and have a short side against the plane-parallel support, two sides, which enclose an obtuse angle with said short side are reflecting, and he two remaining sides enclose an obtuse angle with each other and are directed towards the incident light, the whole cross-section being symmetrical relative to the short side touching the plane parallel support.

4. A device as claimed in claim 1, characterized in that the prismatic bodies have a cross-section corresponding to an isosceles trapezium the top of which touches the plane-parallel support and the upright sides of which are reflecting, a triangular recess present symmetrically relatively to the trapezium being formed from the base in the plane of the trapezium.

5. A device as claimed in claim 3, characterized in that the space between the prismatic bodies and the support is occupied by reflecting members which accurately adjoin the side faces of the prismatic bodies.

* * * * *